Dec. 13, 1927.

W. PIERCE

TRAFFIC SIGNAL

Filed Oct. 2, 1924

1,652,728

Inventor
W. Pierce
by Hogan and Miller
Att'ys

Patented Dec. 13, 1927.

1,652,728

UNITED STATES PATENT OFFICE.

WALTER PIERCE, OF GLENDALE, CALIFORNIA.

TRAFFIC SIGNAL.

Application filed October 2, 1924. Serial No. 741,192.

My invention relates to improvements in traffic signals particularly adapted to use with automobiles.

The improvement is in the semaphore type of signal in which a swinging arm attached to a suitable part of the vehicle may be manually swung to different positions to give different signals.

My particular invention relates to the manner of illuminating the signal the instant it is brought into use whether it is moved or not.

I also provide means for returning the signal to its non-indicating position when not in use.

I provide a flexible chain which may be carried from the semaphore to a convenient part of the vehicle and a special bracket to secure the chain in any one of several positions, thereby placing the semaphore in the desired position.

My invention will be more clearly understood from the following specification and accompanying drawings, in which Figure 1 is a rear elevation partially in section of my semaphore and is a view of Fig. 2 as indicated by the arrow.

Figures 1, 2, 3:
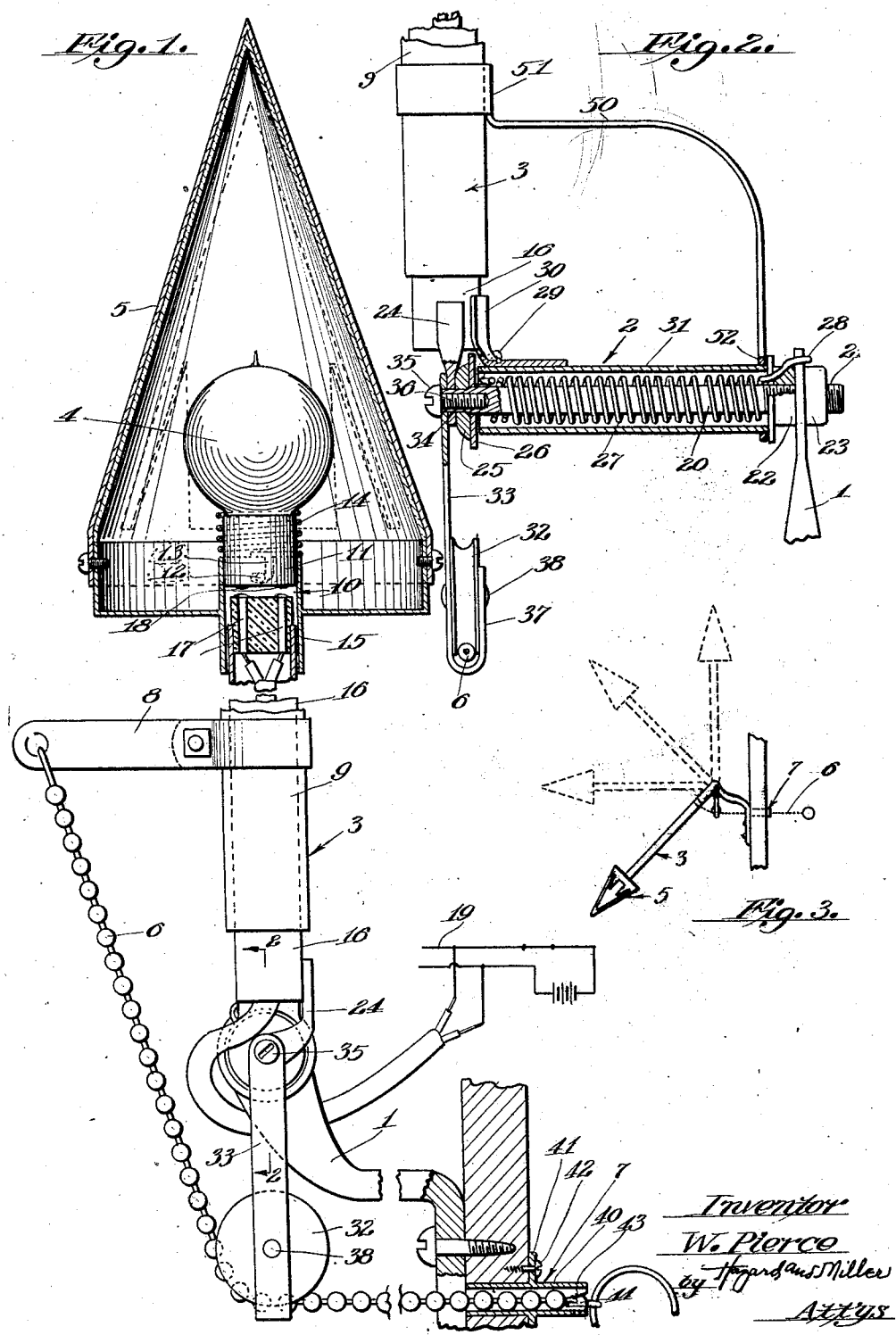
Fig. 2 is a view of Fig. 1 in partial section on the line 2—2 of Fig. 1.
Fig. 3 is a diagrammatic view illustrating my semaphore attached to a vehicle and the various positions it may occupy.

As indicated in the drawings, the bracket 1 is attached to a vehicle and supports an arm 2 which in turn forms a mounting for the semaphore arm 3. The latter at its outer end has an electric illuminating bulb 4 covered by a suitable transparent indicator 5. The semaphore is swung in various positions by the chain 6 and held in the position desired by the securing bracket 7. In pulling the chain an arm 8 rigidly secured to a sleeve 9 gives the bulb a sliding movement to form an electric contact 10 and thereby illuminate the signal. The construction for lighting the lamp is composed of the following elements:

The bulb has a stem 11 provided with a pin 12 fitting into a bayonet slot 13 as shown dotted in Fig. 1 and is held in tight position in the slot by a spring 14 engaging the end of the sleeve 15. This sleeve has a sliding movement on the tube 16 which contains the electric terminals 17 which contact with the terminals 18 of the bulb when the arm 8 slides the sleeve 9 inward. Suitable leads are taken to the electric light circuit of the vehicle indicated by 19.

The semaphore arm 3 is normally maintained in a vertical or other desired position by the structure indicated more particularly in Fig. 2. The arm 2 is built up of a rod 20 screw threaded at 21 and secured to the bracket 1 by nuts 22 and 23. The opposite end of the rod 20 is squared and has rigidly secured thereto a stop lug 24 with a squared apertured washer 25 and a round apertured washer 26. Spirally wound on the rod 20 is a spring 27 having engagement 28 with the fixed bracket 1. Its opposite end 29 is connected to a bracket 30 which is rigidly secured to a rotatable sleeve 31, which latter contains the spring 27 and the rod 20. The bracket 30 is rigidly secured to the semaphore arm 3 by its connection to the tube 16.

To form a convenient lead for the chain 6, I support a pulley 32 by means of a sling 33 held in a fixed position on the rod 20 by the squared end 34 and screw 35 which is threaded as indicated by 36 into the end of the rod 20. The sling 33 is bent into U-shape as indicated at 37 and the pulley 32 rotates on the pin 38. In order to swing the semaphore the chain 6 is lead through a bracket 7 suitably positioned on the automoble and is held in any desired position by this bracket. A convenient means for effecting this function is by passing the chain through a tube 40 which is shown secured by a collar 41 and screws 42 to part of the vehicle. The inner portion of the tube is formed with a notch 43 so that on bending a link sideways it engages the notch and holds the chain in the desired position, as indicated by the link 44.

In order to positively turn out the lamp when the semaphore is released and returned to its normal position, I attach a spring 50 to the arm 8 at 51. The other end of the spring is hooked at 52 around the sleeve 31. This spring is always under tension and tends to press the sleeve 9 outward. Other types of spring will do, as a helical spring around the tube 16 and secured at one end to the bracket 30.

In operation the semaphore will normally be held in a vertical position as shown dotted in Fig. 3, held in such position by the coil spring 20 and the stop lug 24. When it is desired to give a signal as right or left turn or stop, the operator pulls the chain 6. The first action of this is to slide the sleeve 9 on the tube 16, thereby establishing the electric contacts 10. This illuminates the semaphore. A further pull on the chain 6 swings the arm downward until it may be pointing upward as shown dotted in Fig. 3 at an angle of 45° indicating the usual right turn, or pointing downward at 45° as shown in full lines indicating the usual stop signal. The semaphore is held in any one of the desired positions by hooking a link 44 of the chain 6 in the notch 43. This holds the semaphore in the desired position and illuminated. As soon as the chain is released, the spring 50 slides the sleeve 9 outward and breaks the electric connection 10, thereby turning the light off. The spring 20 which is normally under tension returns the semaphore to the vertical position as shown dotted in Fig. 3.

It will thus be seen that my construction provides a simple semaphore signal in which a pull on the flexible chain causes the lighting of the lamp and swings the semaphore to its signaling position where it may be held. On letting go or disengaging the chain the semaphore immediately swings upward to its non-signaling position and the electric circuit is broken, extinguishing the light. I have designated the vertical position dotted in Fig. 3 as "non-signaling", but if desired this may be interpreted as a "straight ahead" signal.

Various changes may be made without departing from the spirit of the invention as claimed.

I claim:

1. A traffic signal comprising in combination a semaphore arm, means to pivotally connect same to a vehicle, said arm having a tube with a sleeve slidable thereon, an electric lamp mounted in the sleeve having electric contact elements, a plug inserted in the end of the tube, having electric terminals to engage with those of the sleeve, electric leads from said terminals to a source of power, a moving means connected to the sleeve to slide same in one direction and at the same time to swing the semaphore arm on its pivot, and a spring connected at one end to a fixed position and at the other end to the sleeve to move the sleeve in a direction opposite to that of the first mentioned moving means and to hold said contacts and terminals normally disengaged.

2. A traffic signal including in combination a semaphore arm comprising a first and a second element, means including said elements for mounting the second element so as to be longitudinally slidable with respect to the first, means for pivotally mounting said first element on a vehicle, an electric lamp mounted in said second element, means associated with said two elements whereby the lamp circuit is closed or opened on the sliding of said second element with respect to the first element, means for moving the slidable element in one direction to normally break the circuit, and means for moving said element in the other direction to close the lamp circuit and rotate the semaphore on its pivot.

3. A traffic signal comprising in combination an oscillatable semaphore arm, means to pivotally connect the same to a vehicle, said semaphore arm having a stationary and a longitudinally slidable element, an electric lamp mounted in said slidable element, an electric circuit for said lamp, means to make and break the circuit on the sliding of the slidable element, a first means to slide the slidable element in one direction, and manually operated means connected to the slidable element to slide said element in an opposite direction to that of said first means and at the same time to turn said semaphore arm on its pivot.

4. A traffic signal comprising in combination a semaphore arm, means to pivotally connect same to a vehicle, said arm having a tube with a sleeve slidable thereon, a plug having electric terminals in the end of the tube, an electric lamp having contact points mounted in the sleeve, said terminals and contact points being positioned to interengage, an arm attached to the sleeve, a pulling device connected to said arm to pull the arm and hence the sleeve in one direction to engage the plug terminals and lamp contact points and at the same time to swing the semaphore arm on its pivot, and a spring having one end held in a fixed position and the other end secured to the sleeve, the said spring shifting the sleeve and normally holding said terminals and contact points disengaged.

5. A traffic signal comprising in combination a bracket attached to a vehicle, a supporting arm having a rod, a first spring coiled on said rod, a rotatable sleeve surrounding the spring, the spring being connected to the sleeve at one end and to the bracket at the other, a semaphore arm attached to the sleeve, said arm having a longitudinally slidable element, an electric lamp mounted in said element, an electric circuit for said lamp, means to make and break the circuit on the sliding of the slidable element, a second spring to slide the slidable element in one direction, connected between said element and the rotatable sleeve, and means connected to the slidable element to slide such element in a direction opposite to that of the second spring connected to the slidable element and at the same time to turn the rotatable sleeve and semaphore arm and tension the said first spring.

6. A traffic signal comprising in combination a bracket attached to a vehicle, a supporting arm having a rod, a first spring coiled on said rod, a rotatable sleeve surrounding the spring, one end of the spring being connected to the sleeve and the other end to the bracket, a semaphore arm having a tube, the tube being connected to the rotatable sleeve and having a slidable sleeve on the tube, a second spring connected between the rotatable and slidable sleeves, an electric lamp having contact points mounted in the slidable sleeve, a plug having electric terminals mounted in the end of the tube, electric leads from said terminals to a source of power, and means connected to the slidable sleeve to slide same in a direction opposite to that of the second spring and at the same time to rotate the rotatable sleeve and semaphore arm and tension the said first spring.

In testimony whereof I have signed my name to this specification.

WALTER PIERCE.